United States Patent [19]

Woodwell

[11] 4,444,459
[45] Apr. 24, 1984

[54] FIBER OPTIC SLIP RING

[75] Inventor: Philip E. Woodwell, Puyallup, Wash.

[73] Assignee: The Boeing Company, Seattle, Wash.

[21] Appl. No.: 278,015

[22] Filed: Jun. 29, 1981

[51] Int. Cl.³ .............................................. G02B 5/172
[52] U.S. Cl. ..................................................... 350/96.15
[58] Field of Search .................. 350/96.15, 96.16, 96.20

[56] References Cited

U.S. PATENT DOCUMENTS

| | | | |
|---|---|---|---|
| 2,365,864 | 12/1944 | Chapman | 362/26 |
| 2,480,393 | 8/1949 | Bossert et al. | 362/32 |
| 2,692,938 | 10/1954 | Cone | 362/32 |
| 2,988,631 | 6/1961 | Hershey et al. | 362/24 |
| 2,993,985 | 7/1961 | Scrabonia | 362/26 |
| 3,102,953 | 9/1963 | Wallace | 378/1 |
| 3,354,405 | 11/1967 | Bebb et al. | 372/66 |
| 3,535,023 | 10/1970 | Yamanaka et al. | 350/432 |
| 3,617,109 | 11/1971 | Tien | 350/96.15 |
| 3,934,148 | 1/1976 | Collins | 350/96.10 |
| 3,984,154 | 10/1976 | Chin et al. | 350/201 |
| 4,013,365 | 3/1977 | Vali et al. | 356/106 LR |
| 4,027,945 | 6/1977 | Iverson | 350/96.22 |
| 4,109,997 | 8/1978 | Iverson | 350/96.15 |
| 4,112,389 | 9/1978 | Streifer et al. | 331/94.5 H |
| 4,120,587 | 10/1978 | Vali et al. | 356/106 LR |
| 4,204,743 | 5/1980 | Etaix | 350/96.20 |
| 4,277,134 | 7/1981 | Upton, Jr. | 350/96.15 |
| 4,278,323 | 7/1981 | Waldman | 350/96.20 |
| 4,314,740 | 2/1982 | Bickel | 350/96.15 |
| 4,355,863 | 10/1982 | Aulich et al. | 350/96.15 |

Primary Examiner—John D. Lee
Assistant Examiner—Frank Gonzalez
Attorney, Agent, or Firm—William C. Anderson

[57] ABSTRACT

This invention provides an apparatus for transferring light between a source (30) of light and a receiver (60) of light potentially having relative motion therebetween precluding physical contact. In its simplest form, the present invention uses one or more looped optical waveguides (40) clad or coated to guide light along the waveguide (40). The waveguide (40) is uncoated or unclad along a window or a portion (44) of the periphery of the waveguide (40). Once the light source (30) is coupled into the end of the waveguide (40), light may be emitted from the window (44) and transferred to the receiver (60). An optical slip ring 80 of the present invention comprises one or more optical fiber waveguides (40) attachable by means of an index matching medium (130) to an optically transparent ring (50). The ring (40) is illuminated by light that is emitted through a window or a portion 44 of the periphery of each waveguide (40). A reflective coating or a shield (140) aids in directing light emitted from the waveguide (40) towards the ring (50) and prevents cross-talk in the event that more than one looped waveguide (40) or optical slip ring (80) is used. The ring (50) guides light emitted from the waveguides (40) toward an area, where the receiver (60) is positioned, in an uniform manner ensuring that the receiver (60) is illuminated.

4 Claims, 7 Drawing Figures

U.S. Patent    Apr. 24, 1984    Sheet 1 of 2    4,444,459
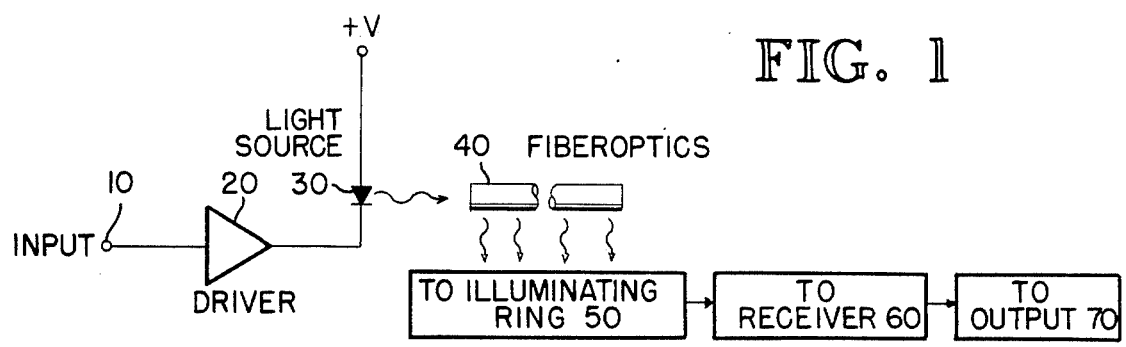
FIG. 1
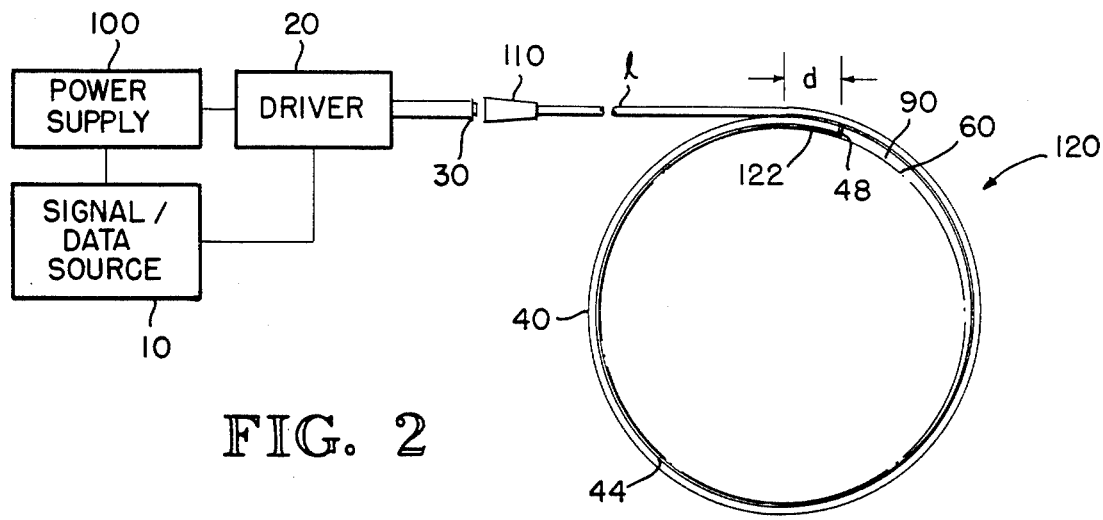
FIG. 2
FIG. 3    FIG. 4A
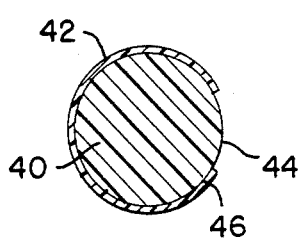 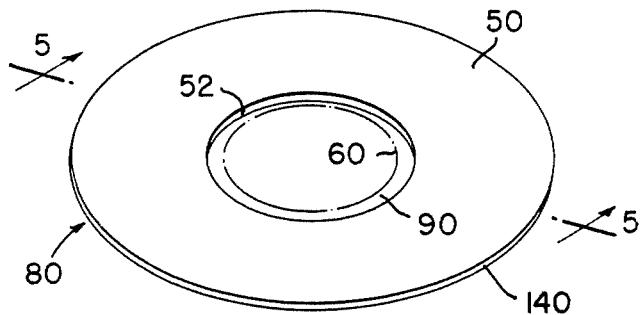

FIBER OPTIC SLIP RING

TECHNICAL FIELD

This invention pertains to an apparatus for the illumination of an optically transparent medium and the transference of that illumination to a near field surface. More particularly, this invention pertains to non-contacting fiber optic slip rings which transfer light signals.

BACKGROUND OF THE INVENTION

Examples of energy transferring systems are plentiful. For example, it is well-known in the art to utilize mechanical slip rings for transferring electrical current from a rotating body to a nonrotating body. Conventionally, a conducting ring on one body is physically contacted by one or more conducting brushes on the other body allowing current to flow between the bodies. This type of mechanical arrangement is subject to wear and self-generating electrical noise which may obscure the signal being transmitted.

More recently, optical slip rings, exemplified by U.S. Pat. No. 4,027,945, issued June 7, 1977, to Iverson, have been disclosed, whereby signals may be transferred from a rotating body to a nonrotating body without any physical contact. In Iverson, fiber optic bundles are utilized to conduct light signals across a small gap from a rotating body to separate fiber bundles located on the other body.

The system of Iverson and others representative of the art suffer from certain disadvantages, i.e., that (1) light may not be extracted anywhere but must be extracted at particular points, (2) a precise optical path is usually required, and (3) the systems are complicated in construction and relatively inflexible in design.

BRIEF SUMMARY OF THE INVENTION

An object of the present invention is to provide an apparatus for transferring light.

Another object of the present invention is to provide an apparatus ensuring illumination of a near field surface.

A further object of the present invention is to provide an apparatus for transferring light between bodies having relative motion therebetween.

The present invention provides a fiber optic slip ring for transmitting light signals from a first body to a second body wherein one of the bodies is capable of rotation relative to the other body about an axis of rotation. The present slip ring comprises, as a first body, an optically transparent light transmitting ring wherein the transparent ring has an outer circumferential surface and an inner circumferential surface. At least one optical fiber is provided having a core surrounded by cladding adapted to guide light along the fiber. An opening is formed in the cladding to expose the core along a portion of its length and about a portion of its circumference. The fiber is affixed to the outer surface of the transparent ring with the opening facing the entire circumference of the outer surface. A light source is coupled to the fiber whereby when light is transmitted along the fiber a light detector, forming the second body and being positioned adjacent to but separated from the inner surface, is illuminated.

The apparatus of the present invention also provides an optical slip ring for transferring light between bodies having relative motion therebetween. The present optical slip ring comprises an optically transparent light transmitting ring body having an inner light-receiving surface and an outer light-radiating surface. One or more fibers are clad with a coating promoting the transmission of light within the fibers and have a light-radiating window disposed along a portion of its length and circumference. The fibers are affixed to the inner surface of the ring to ensure that each window faces the entire circumference of the inner surface. In use, a second body or a light detector disposed adjacent to but separated from the outer surface of the ring body receives light transferred from a light source coupled to each of the fibers.

As a result of using the present invention, light may be transferred from the light source to the near field surface in a reliable and simple manner. The system provides uniform illumination, i.e., light can be extracted anywhere from a specific surface area of the fiber optic waveguide or the transferring means. The light source is not critical and may be any optical radiation source. Furthermore, the system of the present invention does not require a precise optical path. Only the end of the waveguide is coupled to the light source to ensure maximum usage of the source of light. Finally, it is important to note that a light source used with the present invention need not be positioned closely to the near field surface. The present invention consequently allows remote transferrence of light in a reliable and flexible manner.

BRIEF DESCRIPTION OF THE DRAWINGS

Further advantages of the present invention will be apparent from a description which follows of possible embodiments according to the invention given with reference to the accompanying drawing figures in which:

FIG. 1 is a schematic diagram of the present invention.

FIG. 2 is a schematic diagram of a fiber optical waveguide useful in the present invention.

FIG. 3 illustrates the cross section of the optical waveguide of FIG. 2.

FIG. 4A is a simplified perspective view of an embodiment of an optical slip ring according to the invention.

DETAILED DESCRIPTION OF THE INVENTION

Figure 4B:
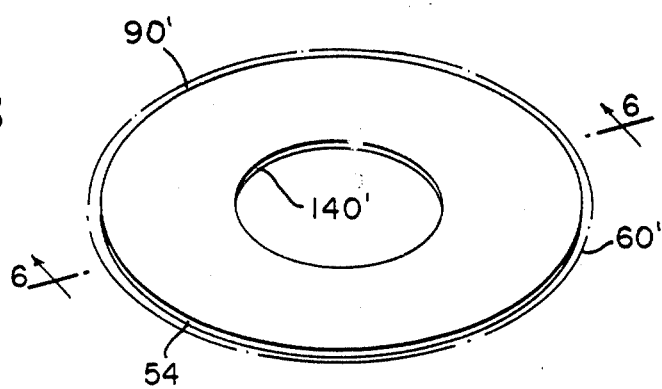
FIG. 4B is a simplified perspective of an alternate embodiment of an optical slip ring according to the present invention.

Referring now to the drawings and more particularly to FIG. 1, wherein like reference numerals refer to like parts and elements throughout the several views there is shown a schematic diagram of a typical electronic circuit which may be used to convert an input, e.g., in digital, analog or other form, into light capable of being transferred according to the present invention. An input or a signal/data source 10 may be provided to a conventional amplifier/driver 20 and fed to a conventional optical radiation source such as a laser diode, laser, lamp, etc., or, as in the present example, a light emitting diode (LED) 30. Light emitted from the LED 30 enters one or more conventional fiber optic waveguides 40.

The waveguide is provided with conventional cladding or a coating 42 whereby light may be guided along the waveguide 40 in a well-known manner.

The waveguide 40 may be used alone or in combination with an optically transparent light transferring or illuminating ring 50 thereby forming an optical slip ring 80 (to be described in greater detail, hereinafter). In either case, the cladding or the coating 42 on the fiber optic waveguide 40 is removed to form an unclad or uncoated window 44 (see FIG. 3) whereby light may be emitted only from a portion of the peripheral surface of the waveguide.

The light emitted from the window 44 may be received by a conventional near field surface or a receiver 60 (directly, if one or more waveguides 40 are used alone) or by the ring 50 which transfers the light received from one or more waveguides to the receiver 60. The receiver 60 may also transmit a corresponding optical signal to a conventional receiver/output means 70. Optionally, the receiver 60 may have relative motion between the one or more waveguides 40 or the slip ring 80. For example, a receiver may be rotating or fixed relative to a correspondingly rotating or fixed waveguide 40 or slip ring 80. Preferably, the one or more waveguides 40 and the slip ring 80 are fixed relative to a receiver 60.

A receiver, as defined herein, could mean a single point detector, such as, for example, a single waveguide, or, if multiple fiber optical waveguides are used, a distribution system (not shown) may be formed. The waveguide or waveguides may be provided with amplifiers that may be closely proximate or remote from either the one or more waveguides 40, if used alone, or the slip ring 80. The receivers 60, 70 may also be other conventional devices that receive light energy and in response thereto produce a desired effect. Optionally, a receiver at 60 or at 70 may be a device that receives and directly uses the transferred light energy.

In the case of an analog system, an analog receiver/driver may be used to drive a meter, motor, relay, loudspeaker or an ultrasonic device (not shown). In the case of a digital system, a digital receiver/driver (not shown) might operate a digital readout (not shown), feed information into a computer (not shown) or be used for remote communication. Of course, either a digital or analog signal can be converted to the other signal, external to either the waveguide 40 (if used alone) or to the illuminating ring 50, using conventional digital-analog converters or analog-digital converters.

Referring now to FIG. 2, the interrelationship between a representative signal/data source 10, the LED 30 and a fiber optic waveguide 40 may be seen. A power supply 100 provides power for the data source 10 and the LED driver 20 whereby an appropriate signal level and drive power for the light source or the LED 30 may be obtained. Light emitted from the LED 30 is directed and focused to the waveguide 40 by means of a conventional LED housing 110 coupled to the end of the fiber optic waveguide 40.

In the present invention, the waveguide 40 may be disposed in a substantially circular loop or an array 120. The waveguide cladding or coating is removed, either before or after making the loop 120, along a selected portion of the periphery of the waveguides to form the window 44 (see FIG. 3). The window 44 should not be formed in the length 1; otherwise light losses will be excessive. An end of the waveguide is overlapped or interlaced, as at 122, for a distance whereby an overlapping of the window 44 may be effectuated. After the array is formed it should be inspected using a conventional optical means to ensure that no dark spots may be detected.

The window 44 allows light to be emitted along the length and a portion of the circumference 46 of the waveguide 40 towards either the receiver 60 directly or towards the ring 50. At the terminal portion of the waveguide, a reflection means such as a reflective coating 48 may be provided in order to ensure the optimum retention of light within the waveguide 40.

Furthermore, the cross-sectional shape of the waveguide 40 does not have to be circular as is shown in FIG. 3. Any cross-sectional configuration, including rectangular, square or elliptical, may be used as long as only one window 44 is provided.

When the array 120 is used alone, i.e., without the ring 50, a receiver 60 or 60' may be disposed either inside (as shown in FIG. 2) or outside the array 120 as analogously shown in FIG. 4B (the potential boundary of a receiver 60, 60' has been represented by the dashed lines). Whether a receiver is located inside or outside of an array 120, it should be clear that the array should be configured to ensure that the window 44 faces the receiver.

Figure 5:
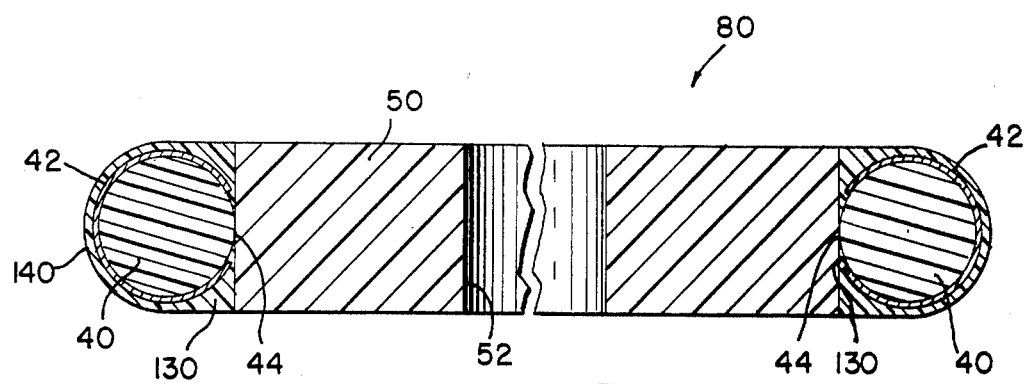
FIG. 5 is an enlarged cross sectional view taken along line 5—5 in FIG. 4A.

Another embodiment of the present invention is shown in FIGS. 4A and 5 and is illustrated as an optical slip ring 80 comprising the array 120 attached to the optically transparent illuminating ring 50. The receiver 60 is also shown as being disposable in the central portion or area of the illuminating ring 50, facing an inner illuminating surface 52, separated therefrom by a small gap 90. For the sake of clarity, the receiver 60 is only schematically illustrated in FIG. 5.

The gap 90 should be as small as possible to increase the efficiency of the system. Also, optical attenuation is reduced by keeping the size of the ring 50 small, i.e., the difference between the inner and the outer diameter and the thickness of the ring 50 should be minimized.

The window 44 of the circular array 120 may be attached to the transparent illuminating ring 50 by means of a conventional index matching medium 130 such as epoxy cement or a jel (see FIG. 5). The medium 130 reduces light losses as light is being transferred between the ring 50 and the waveguide 40. Preferably, the indices of refraction of the waveguides 40, the medium 130 and the ring 50 are substantially the same.

Additionally, when the array 120 is used alone or attached to the ring 50, a reflective coating or a shield 140, such as an appropriate reflective material deposition or a reflective mylar shield, may be disposed about the array 120 to ensure that any stray moving light is redirected to the receiver 60 (in the case of the use of the array 120 alone) or through the ring 50 towards the receiver 60. The shield 140 may be necessary if there is stray light off the interface between the ring 50 and the waveguide 40. Further, even if a shield 140 is used, an intense light source may cause the emission of light from the clad or coated surface of the waveguide 40. If light is emitted from the periphery of the waveguide other than from the window 44, not only will the loss of light be great, but, light will be transferred in an uncontrolled manner. However, the problem of stray light may be minimized by proper selection of the cladding or coating, light source intensity and proper coupling of the light source to the optical waveguide.

In use of the embodiment of FIG. 5, light from the LED 30 is directed through the optical waveguide 40 to the section of the waveguides attached to the transparent illuminating ring 50. The ring 50 receives the light emitted from the window 44 and guides this emitted light towards the inner surface 52. Because of the difference in the index of refraction of the material of the ring and the air surrounding the ring, the area of the surface 52 is uniformly illuminated whereby a 360 degree illuminating surface is formed.

The receiver 60 receives the light emitted by the surface 52 and may then transmit this light or information to a conventional remote output means 70. Alternatively, in an embodiment not shown, the receiver 60 could be the ultimate user or processor of the light, i.e., the receiver 60 could be a conventional output means directly using the data or information received from the illuminating inner surface 52 as explained earlier.

Figure 6:
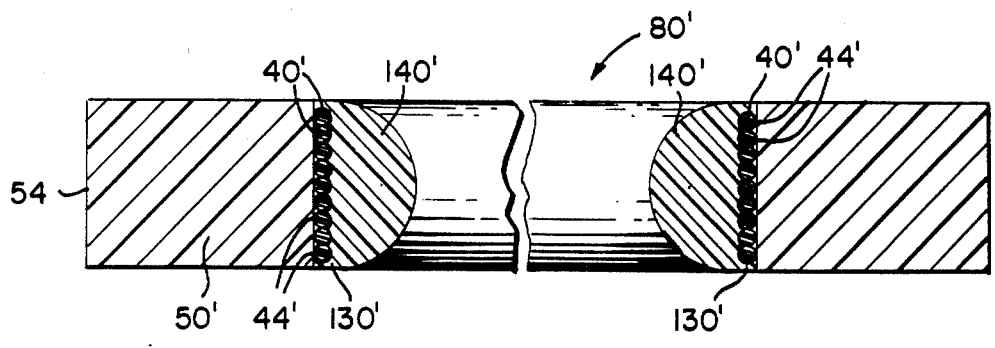
FIG. 6 is a cross sectional view taken along line 6—6 in FIG. 4B.

Another embodiment of the present invention is illustrated in FIGS. 4B and 6 as an optical slip ring 80' comprising an array 120' and a ring 50'. The array 120' comprises a plurality of waveguides 40', each having a window 44'. Each waveguide may be attached by an index-matching medium 130' to the interior of the ring 50' and shielded by a reflective material 140'. More than one waveguide should be used if additional illumination of a receiver is desired or necessary. Light from a source of light may be coupled into each of the plurality of waveguides 40' by means of the housing 110 or a pigtailed light source (not shown) may be employed.

It is important to emphasize that the provision of a window upon a waveguide greatly increases the loss of light as it is guided along the waveguide. Consequently, the usable length for the window 44 or the window 44' is limited by the transmission properties of the waveguide, waveguide diameter, light intensity available to the window 44 or the window 44' and the number of waveguides used. Therefore, a waveguide probably could be looped for a number of turns dependent upon size, materials, light source, receiver sensitivity, etc.

In the embodiment of FIG. 6, one way of terminating the waveguides 40' is to nestle or stack the waveguides, one upon the other resulting in a 360 degree illumination by the cylindrical array. Of course, the window 44' of each waveguide 40' should be positioned to face a receiver 60'.

In this system, the receiver 60' (not shown in FIG. 6, but see FIG. 4B) could be disposed proximate the exterior surface 54 of the illuminating ring 50' separated therefrom by a small gap 90'. In use, the surface 54 will be uniformly illuminated by the light emitted from each window 44'. Consequently, the receiver will be able to receive optical information anywhere from the 360 degree surface area of the surface 54.

A system of this invention is extremely reliable in that the system does not require a precise optical path between the light source and the receiver once the light source is coupled to one or more waveguides. The light source is not critical because a system of the present invention is capable of using substantially any optical radiation source. More particularly, the present invention can provide uniform illumination about 360 degrees because light can be extracted anywhere from the window 44, 44' of a waveguide, the inner surface 52 of the illuminating ring 50, or the outer surface of the ring 50'. Finally, the system is flexible because the light source and/or the receiver need not be closely adjacent the ring 50. The light source could be quite distant from the ring 50 and/or a receiver because light is transmitted through one or more waveguides.

Optical slip rings 80, 80' or the array 120 may be designed to pass data in either digital or analog form at rates determined primarily by the source and/or the receiver/detector capability. Furthermore, the spectrum of light which the present system is capable of handling is generally between infrared and ultraviolet. The optically transparent materials used in the present invention would obviously have to be chosen to optimize the transmission of the selected wave length(s) of light.

The systems of the present invention can potentially pass multiple channel transmissions by wavelength division multiplexing, time division multiplexing, stacking a plurality of optical slip rings or stacking a plurality of arrays 120. A shield (not shown) about the array 120 or the shields 140 (140') would aid in precluding cross-talk in the event that the systems of the present invention are stacked for multiple channel information transmission. The data bandwidth of the systems of the present invention is limited mostly by the light source and/or the receiver 60 (60') selected. For example, at present, appropriate circuitry can be used to drive the light emitting diodes at frequencies in excess of $10^7$ hertz (Hz) and laser diodes at frequencies in excess of $10^8$ Hz.

Obviously many variations of the present invention are possible in light of the above teachings. For example, there may be useful combinations of the array 120, optical slip rings 80, 80', as will be apparent to the skilled artisan. It is therefore to be understood that within the scope of the appendent claims the invention may be practiced otherwise than as specifically described.

What is claimed and desired to be secured by Letters Patent of the United States is:

1. A fiber optic slip ring for transmitting light signals from a first body to a second body, one of said bodies being capable of rotation relative to the other body about an axis of rotation, said slip ring comprising:
    a first body comprising an optically transparent light transmitting ring, said transparent ring having an outer circumferential surface and an inner circumferential surface;
    at least one optical fiber having a core surrounded by cladding adapted to guide light along said fiber;
    an opening formed in said cladding to expose said core along a portion of its length and about a portion of its circumference;
    means for affixing said fiber to said outer surface, said opening facing the entire circumference of said outer surface;
    means forming a light source coupled to said fiber, and
    a second body disposed adjacent to but separated from said inner surface, said body comprising means for detecting light.

2. The optic slip ring of claim 1, further comprising reflecting means disposed about said fiber for redirecting random light emitted from said opening towards said transparent ring.

3. The optic slip ring of claim 2, wherein said affixing means comprises a light transmissive adhesive.

4. The optic slip ring of claim 3, wherein the indices of refraction of said fiber, said adhesive and said transparent ring are substantially the same.

* * * * *